United States Patent
Zhang et al.

(10) Patent No.: US 10,019,516 B2
(45) Date of Patent: Jul. 10, 2018

(54) SYSTEM AND METHOD FOR FUZZY ONTOLOGY MATCHING AND SEARCH ACROSS ONTOLOGIES

(71) Applicants: Chevron U.S.A. Inc., San Ramon, CA (US); University of Southern California, Los Angeles, CA (US)

(72) Inventors: Yinuo Zhang, Los Angeles, CA (US); Anand V. Panangadan, Los Angeles, CA (US); Randall G. McKee, Houston, TX (US); Mauritz Theron, Bakersfield, CA (US); Benjamin D. Gamble, Porterville, CA (US); Viktor K. Prasanna, Los Angeles, CA (US)

(73) Assignees: University of Southern California, Los Angeles, CA (US); Chevron U.S.A. Inc., San Ramon, CA (US)

( * ) Notice: Subject to any disclaimer, the term of this patent is extended or adjusted under 35 U.S.C. 154(b) by 218 days.

(21) Appl. No.: 14/678,943

(22) Filed: Apr. 4, 2015

(65) Prior Publication Data
US 2015/0286713 A1 Oct. 8, 2015

Related U.S. Application Data

(60) Provisional application No. 61/975,093, filed on Apr. 4, 2014.

(51) Int. Cl.
*G06F 17/30* (2006.01)
*G06N 5/02* (2006.01)

(52) U.S. Cl.
CPC ......... *G06F 17/30734* (2013.01); *G06N 5/02* (2013.01)

(58) Field of Classification Search
CPC .................. G06F 17/30734; G06N 5/02
See application file for complete search history.

(56) References Cited

U.S. PATENT DOCUMENTS 7,814,107 B1 * 10/2010 Thirumalai ....... G06F 17/30011
707/749
2009/0210418 A1 * 8/2009 Arasu ............... G06F 17/30569
(Continued)

OTHER PUBLICATIONS

Zhang, Yinuo, et al.; "UFOM: Unified Fuzzy Ontology Matching"; 2014, IEEE IRI Conference, San Francisco, CA, pp. 787-794.
(Continued)

*Primary Examiner* — Jared M Bibbee
(74) *Attorney, Agent, or Firm* — Andrew J. Lagatta; Melissa M. Hayworth; Ana C. Jaquez

(57) ABSTRACT

A computer implemented method of matching ontologies is disclosed. The method includes, for each pair of entities of a first ontology and a second ontology, wherein each pair of entities includes a first entity from a first plurality of entities of the first ontology and a second entity from a second plurality of entities of the second ontology, and wherein the first entity and the second entity of each pair of entities is of a same data type: (1) determining a vector of similarities for the pair of entities; (2) determining a confidence score for the vector of similarities; (3) determining a relation score for each relation type based on the vector of similarities to measure relatedness between the first entity of the pair of entities and the second entity of the pair of entities; and (4) generating a mapping ontology based on the relation type, the relation score, and the confidence score of each pair of entities.

22 Claims, 11 Drawing Sheets

(56) References Cited

U.S. PATENT DOCUMENTS

| | | | | |
|---|---|---|---|---|
| 2010/0131516 A1* | 5/2010 | Jean-Mary | G06F 17/30864 | 707/749 |
| 2011/0282652 A1* | 11/2011 | Fokoue-Nkoutche | G06F 17/30734 | 704/9 |
| 2012/0078595 A1* | 3/2012 | Balandin | G06F 17/30734 | 703/6 |
| 2012/0284259 A1* | 11/2012 | Jehuda | G06F 17/30734 | 707/722 |
| 2013/0290338 A1* | 10/2013 | Lee | G06F 17/30731 | 707/739 |
| 2014/0052688 A1* | 2/2014 | Bansal | G06N 7/02 | 706/52 |
| 2014/0280353 A1* | 9/2014 | Delaney | G06F 17/30734 | 707/794 |
| 2014/0372364 A1* | 12/2014 | Anantharam | G06F 17/30734 | 706/55 |

OTHER PUBLICATIONS

Shvaiko, P. and J. Euzenat, "Ontology matching: State of the art and future challenges," IEEE Trans. Knowl. Data Eng., vol. 25, No. 1, pp. 158-176 (2013).

Choi, N., et al., "A survey on ontology mapping," SIGMOD Record, vol. 35, No. 3, pp. 34-41 (2006).

Lambrix, P. and H. Tan, "Samba—a system for aligning and merging biomedical ontologies," J. Web Sent., vol. 4, No. 3, pp. 196-206 (2006).

Hu, W., et al., "Matching large ontologies: A divide-and-conquer approach," Data Knowl. Eng., vol. 67, No. 1, pp. 140-160 (2008).

Nagy, M. and M. Vargas-Vera, "Multiagent ontology mapping frame-work for the semantic web," IEEE TYransactions on Systems, Man, and Cybernetics, Part A, vol. 41, No. 4, pp. 693-704 (2011).

Li, J., et al., "Rimom: A dynamic multistrategy ontology alignment framework," IEEE Trans. Knowl. Data Eng., vol. 21, No. 8, pp. 1218-1232 (2009).

Jean-Mary, Y.R., et al., "Ontology matching with semantic verification," J. Web Sem., vol. 7, No. 3, pp. 235-251 (2009).

Hanif, M.S. and M. Aono, "An efficient and scalable algorithm for segmented alignment of ontologies of arbitrary size," J. Web Sem., vol, 7, No. 4, pp. 344-356 (2009).

Cruz, I.F., et al., "Agreementmaker: Efficient matching for large real-world schemas and ontologies," PVLDB, vol. 2, No. 2, pp. 1586-1589 (2009).

Albagli, S., et al., "Markov network based ontology matching," J. Comput. Syst. Sci., vol. 78, No. 1, pp. 105-118 (2012).

Niepert, M. et al., "A probabilistic-logical framework for ontology matching," Proceedings of the Twenty-Fourth AAAI Conference on Artificial Intelligence, AAAI-10; pp. 1413-1481 (2010).

Mitra, P., et al., "Omen: A probabilistic ontology mapping tool," International Semantic Web Conference (2005) pp. 537-547.

Cross, V. and X. Hu, "Fuzzy set and semantic similarity in ontology alignment," FUZZ-IEEE (2012) pp. 1-8.

Todorov, K., et al., "A framework for a fuzzy matching between multiple domain ontologies," KES (1) (2011) pp. 538-547.

Albagli, S., et al., "Markov network based ontology matching," Journal of Computer and System Sciences, 78, pp. 105-118 (2012).

"Fuzzy sets and relations," Computational Intelligence. Springer Berline Heidelberg (2005) pp. 37-66. http://dx.doi.org/10.1007/3-540-27335-2_2.

Levenshtein, V., "Vinary Codes Capable of Correcting Deletions, Insertions, and Reversals," Soviet Physics-Diklady, vol. 10, No. 8, pp. 707-710 (1966).

Smith, T. and M. Waterman, "Identification of common molecular subsequences," Journal of Molecular Biology, vol. 147, No. 1, pp. 195-197 (1981) http://www.sciencedirect.com/science/article/pii/0022283681900875.

* cited by examiner

SYSTEM AND METHOD FOR FUZZY ONTOLOGY MATCHING AND SEARCH ACROSS ONTOLOGIES

CROSS-REFERENCE TO RELATED APPLICATIONS

The present application claims priority from U.S. Provisional Patent Application No. 61/975,093, filed on Apr. 4, 2014, the disclosure of which is hereby incorporated by reference in its entirety.

BACKGROUND

Data sources, having named properties, can be organized into ontologies in many different ways. For example, a particular data record may have separate categories or entries for a person's name, address, and other information about that individual, while a second data source may store related information about that same individual, but may organize that data using different categories, such as separation by first name, last name, street, city, and state address, etc. Furthermore, such data may be distributed across a data source, for example across various different tables of a database. Identifying relationships between such data sources, and the associated ontologies represented by those data sources, can be complex.

In particular cases, semantically linking large real-world ontologies populated with entities from heterogeneous sources, problems arise. For example, several entities in different ontologies are expected to be related to each other but not necessarily with one of the typical relationships (e.g., equivalent-to, is-a, part-of, subsumed-by). Intuitively, there are entities that are related since they share a certain amount of mutual information. However, most of the existing systems for ontology matching focus on computing the specific relations of equivalence and subsumption, and as such, may miss entities that are related by some other relationship. Accordingly, improvements in ontology matching, and particular in developing semantic links between real-world ontologies, are desirable.

SUMMARY

In summary, the present disclosure relates to ontology matching, and in particular fuzzy ontology matching and query execution across matched ontologies.

In a first aspect, a computer implemented method of matching ontologies is disclosed. The method includes, for each pair of entities of a first ontology and a second ontology, wherein each pair of entities includes a first entity from a first plurality of entities of the first ontology and a second entity from a second plurality of entities of the second ontology, and wherein the first entity and the second entity of each pair of entities is of a same data type: (1) determining a vector of similarities for the pair of entities; (2) determining a confidence score for the vector of similarities; (3) determining a relation score for each relation type based on the vector of similarities to measure relatedness between the first entity of the pair of entities and the second entity of the pair of entities; and (4) generating a mapping ontology based on the relation type, the relation score, and the confidence score of each pair of entities.

In a second aspect, an apparatus includes at least one memory storing program code; and at least one processor configured to access the memory and execute the program code. The processor is further configured to, for each pair of entities of a first ontology and a second ontology, wherein each pair of entities includes a first entity from a first plurality of entities of the first ontology and a second entity from a second plurality of entities of the second ontology, and wherein the first entity and the second entity of each pair of entities is of a same data type: (1) determine a vector of similarities for the pair of entities; (2) determine a confidence score for the vector of similarities; (3) determine a relation score for each relation type based on the vector of similarities to measure relatedness between the first entity of the pair of entities and the second entity of the pair of entities; and (4) generate a mapping ontology based on the relation type, the relation score, and the confidence score of each pair of entities.

In a third aspect, a program product including program code is disclosed. The program code, when executed, causes a computing system to, for each pair of entities of a first ontology and a second ontology, wherein each pair of entities includes a first entity from a first plurality of entities of the first ontology and a second entity from a second plurality of entities of the second ontology, and wherein the first entity and the second entity of each pair of entities is of a same data type: (1) determine a vector of similarities for the pair of entities; (2) determine a confidence score for the vector of similarities; (3) determine a relation score for each relation type based on the vector of similarities to measure relatedness between the first entity of the pair of entities and the second entity of the pair of entities; and (4) generate a mapping ontology based on the relation type, the relation score, and the confidence score of each pair of entities. The program product includes a computer readable storage medium storing the program code.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
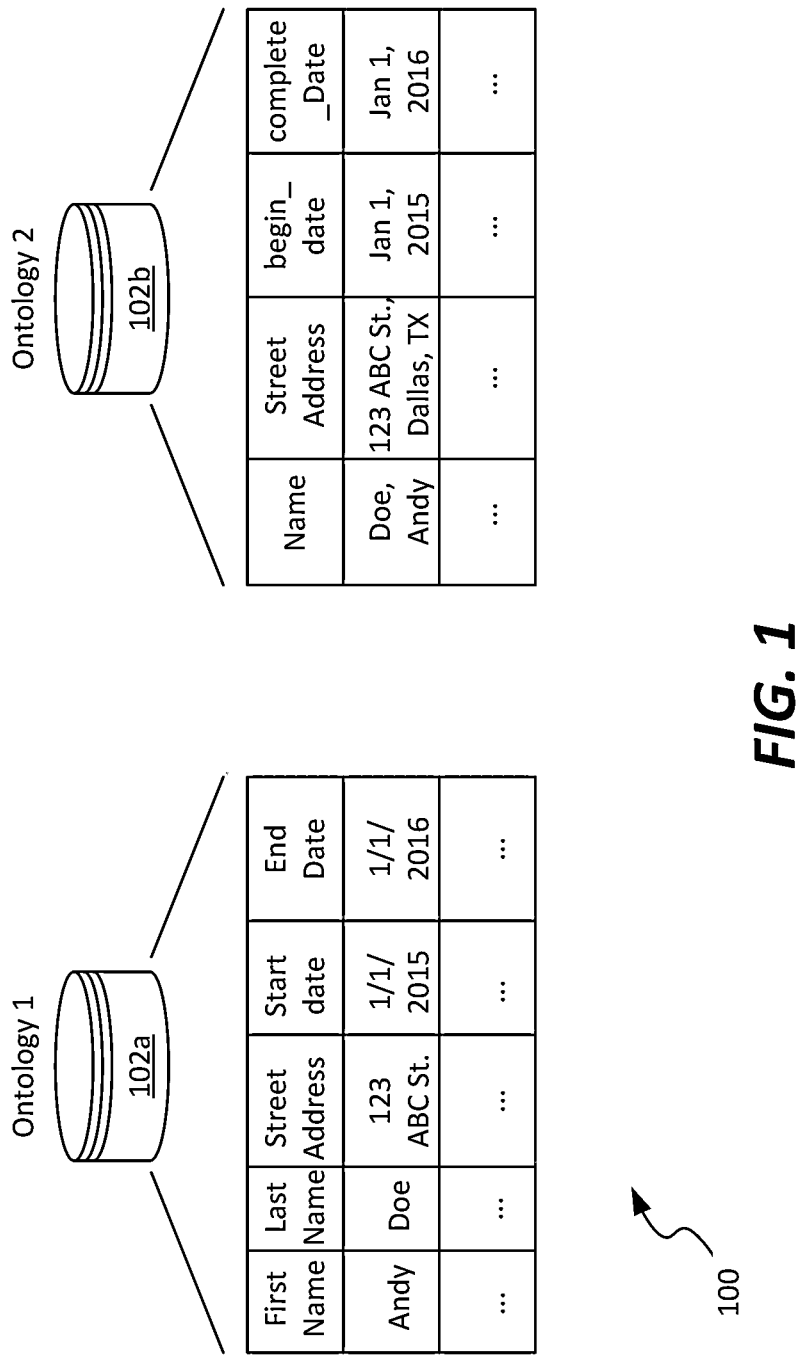
FIG. 1 illustrates example disparate data sets that represent different ontologies, illustrating an example issue addressed by the present disclosure.

As briefly described above, embodiments of the present invention are directed to systems and methods for semantically linking ontologies, for example disparate data sets associated with operational or historical well data. Example systems and methods provided herein determine a similarity between aspects of disparate ontologies and a confidence in that similarity determination, allowing an alignment between the ontologies to be generated. From aligned ontologies, searches can be performed in a coordinated manner across ontologies in a way that is transparent to the querying user, and which can overcome differences in the ontologies provided. An ontology, as represented herein, represents information as a set of formally defined concepts within a domain. Ontologies are semantically linked by discovering alignments between the entities contained in different ontologies.

There may be various use cases in the oil and gas industry for semantically linking large ontologies. As an example, the principles of the present disclosure may be utilized in the context of management of change (e.g., with regards to lifecycle server (LCS) data). Indeed, the principles of the present disclosure may be utilized to automatically detect a relationship between entities in the LCS data (e.g., even across a hierarchy) and create links to represent the detected relationship (such as during construction or a non-operational phase of a well in the oil and gas industry). Furthermore, the principles of the present disclosure may be utilized to maintain and recreate links between related entities in the LCS data (or database) even when the entities are updated (as may often occur when transitioning a well in the oil and gas industry to an operational phase).

The principles of the present disclosure may also be utilized in the context of asset investment planning. For example, a link may be established between a business forecasting tool and scheduling and/or repair data. The principles of the present disclosure may be utilized to detect when an asset investment plan conflicts with availability of resources, as well as when a resource is part of an investment plan.

The principles of the present disclosure may be utilized to integrate data in the oil and gas, such as integrate industry well management data (e.g., data regarding actual operation and optimization of the well), drilling data, data from a reservoir management information system (RMIS), data from a computerized maintenance management system (CMMS), a combination thereof, etc. A CMMS may include data about equipment and its maintenance history including inspections, parts, repairs, etc. A RMIS may include additional well information such as associating wells to reservoirs or into groups of wells so they can be analyzed as a group. For example, the principles of the present disclosure may be utilized to integrate (i) well management data about wells such as production history, subsurface equipment, subsurface information about wells, artificial lift parameters, work order history, etc. (e.g., LOWIS™ data (Life of Well Information Software), which is available from Weatherford International Ltd.) and (ii) drilling data regarding management of all the processes around drilling a well including planning, drilling operations, and reporting (e.g., WellView™ data, which is available from Peloton Computer Enterprises Ltd.) in an oil and gas industry example. For example, another example includes integration of (i) well management data (e.g., LOWIS™ data, which is available from Weatherford International Ltd.) and (ii) data from CMMS or maintenance data such as the information about the surface equipment that supports wells and associated facilities (e.g., EAM™ data, which is available from Infor) as discussed in some of the documents listed hereinbelow. The principles discussed herein may be extended to include a third database or data (e.g., RMIS or the like). As another example, the principles of the present disclosure may be utilized to integrate data from LOWIS™, EAM™, and/or RMIS. Alternatively, other systems and/or data in the oil and gas industry may be integrated. Alternatively, other systems and/or data in the oil and gas industry may be integrated.

In accordance with the present disclosure, an ontology matching system is disclosed that is explicitly designed to discover entities that are relevant to each other across multiple ontologies in addition to the previously defined relationships. By doing so, accuracy may be increased and better query results may be generated. Moreover, by doing so, it may be easier to find related data between two system, even when they don't share a common data model and consistent identifiers. For example, potential results from querying may be as seen in Table 1, below:

TABLE 1

| Query Execution Times | | |
| --- | --- | --- |
| Direct Matching | Nested-loop (ms) | Graph pattern (ms) |
| Input 1 | 5433 | 10279 |
| Input 2 | 4231 | 8111 |
| Input 3 | 401 | 762 |

Further discussion of the items included herein is provided in the following three documents, which are hereby incorporated by reference in their entireties:

Y. Zhang, A. Panangadan, and V. Prasanna., "UFOM: Unified fuzzy ontology matching." In Proc. of the 16th IEEE International Conference on Information Reuse and Integration, 2014, which is hereby incorporated by reference in its entirety Yinuo Zhang, Anand Panangadan, Viktor K. Prasanna. "Rapid Data Integration Framework—Integrating D7i and LOWIS" in U.S. Provisional Patent Application No. 61/975,093, filed on Apr. 4, 2014, the disclosure of which is hereby incorporated by reference in its entirety.

Yinuo Zhang, Anand Panangadan, Viktor Prasanna. "Data Integration Framework Tool" (with redactions) in U.S. Provisional Patent Application No. 61/975,093, filed on Apr. 4, 2014, the disclosure of which is hereby incorporated by reference in its entirety.

Those of ordinary skill in the art will appreciate that this disclosure is not limited to the embodiments discussed herein or incorporated by reference. For example, a particular embodiment may include at least one processor, at least one memory, program code, at least one network, an apparatus (e.g., a computer, a system, etc.), communication capabilities, networking capabilities, etc. Furthermore, an apparatus (e.g., a computer, a system, etc.) claim may be added for each method claim that is included herein. A program product claim may be added for each method claim that is included herein.

An embodiment may, for each pair of entities of a first ontology and a second ontology, wherein each pair of entities includes a first entity from a first plurality of entities of the first ontology and a second entity from a second plurality of entities of the second ontology, and wherein the first entity and the second entity of each pair of entities is of a same data type: determine a vector of similarities for the pair of entities, determine a confidence score for the vector of similarities, and determine a relation score for each relation type based on the vector of similarities to measure relatedness between the first entity of the pair of entities and the second entity of the pair of entities. Furthermore, the particular embodiment may generate a mapping ontology based on the relation type, the relation score, and the confidence score of each pair of entities.

FIG. 1 illustrates example disparate data sets 102a-b that represent different ontologies, illustrating an example issue addressed by the present disclosure. In the example disparate data sets shown, each data set represents a different ontology. In the example shown, a first data set 102a may include a first set of labeled data records, such as may occur in a database. In the example data set 102a shown, these include a first name, a last name, a street address, a start date, and an end date. However, it is noted that a different data set may, although storing analogous or logically linked data, may not be formatted according to an analogous ontology. Continuing the example of FIG. 1., data set 102b includes a single name category (rather than first and last name), and stores a street address in a different format (e.g., including city and state information). Furthermore, although data set 102b stores a begin_date and complete_date, those would not necessarily relate to the start date and end date of data set 102a, since both the data label and the format of stored data differ between those data sets. Additional areas of dissimilarity are possible as well, as represented in further examples discussed herein.

According to general embodiments of the present disclosure, an ontology matching system allows for a determination of a linking between two ontologies, for example represented by semantic web data. Such a system performs a fuzzy matching process to determine a strength of a link, and confidence in that link, between ontologies. Details regarding such ontology matching systems and processes are discussed in further detail below in connection with FIGS. 2-7; details regarding usage of matched ontologies in a querying system are discussed further in connection with FIGS. 8-10, below.

Figure 2:
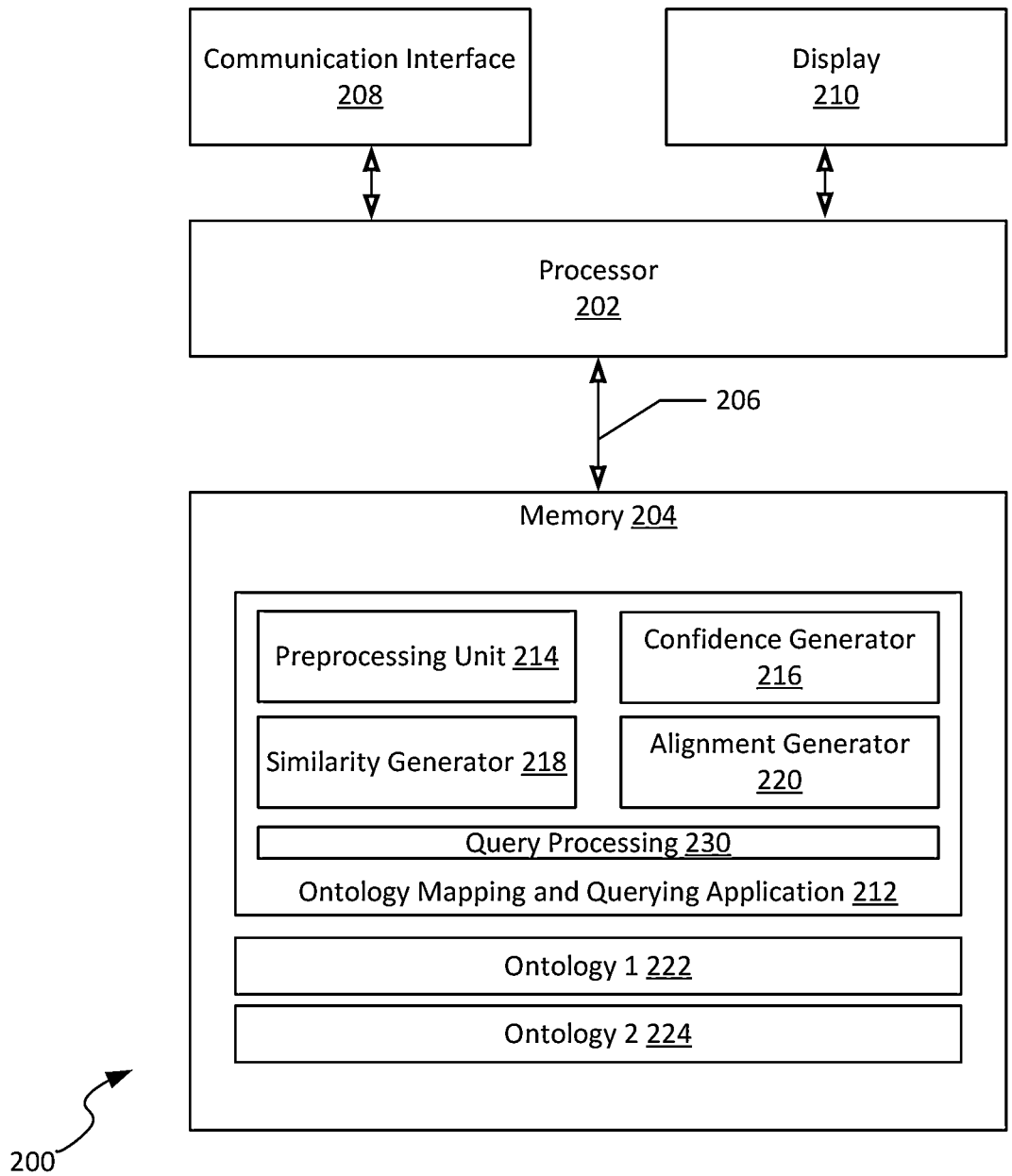
FIG. 2 illustrates a computing system useable to implement aspects of the ontology matching systems and methods described herein, according to an example embodiment.

Referring to FIG. 2, a computing system 200 useable to implement aspects of the ontology matching systems and methods described herein is disclosed. The computing system 200 can, in example embodiments, be configured to store or be interfaced to databases storing data according to differing ontologies, such as ontologies 102a-b of FIG. 1, above In general, the computing system 200 includes a processor 202 communicatively connected to a memory 204 via a data bus 206. The processor 202 can be any of a variety of types of programmable circuits capable of executing computer-readable instructions to perform various tasks, such as mathematical and communication tasks.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory 204 stores an ontology matching and querying application 212, discussed in further detail below. The computing system 200 can also include a communication interface 208 configured to receive and transmit data, for example one or more data streams received from ontologies illustrated in databases 102a-b as seen in FIG. 1. Additionally, a display 210 can be used for presenting a graphical display of the ontology matching and querying application 212.

In various embodiments, the ontology matching and querying application 212 includes a preprocessing unit 214, a confidence generator 216, a similarity generator 218, an alignment generator 220, and a query processing system 230. The ontology matching and querying application 212 generally performs a fuzzy ontology matching process by which matches or similarities can be found between ontologies, and a confidence in the match or correspondence between such ontologies can be provided as well. The memory 204 can also store data in various ontologies, such as ontologies 222, 224, as shown.

In the embodiment shown, the preprocessing unit 214 formulates data to be received by the ontology matching and querying application 212 as semantic web data. In example embodiments, the preprocessing unit 214 includes a constraint-based classifier that classifies entities in a data set based on their types. This formats the data into semantic web format. In example embodiments, subtypes can be used, as are discussed below in connection with the example embodiment of FIG. 3.

The confidence generator 216 computes a confidence score for each correspondence which reflects the sufficiency of the underlying data resources used to generate this correspondence. For example, the more instances that are used for computing similarity, the higher a confidence score, since there would be a higher confidence in the association of data across ontologies. Details regarding operation of an example confidence generator are discussed below in connection with the example embodiment of FIG. 3.

The similarity generator 218 can, in some embodiments, generate a vector of similarities between two entities. The similarities form the basis for computing different types of relation correspondences (using their respective fuzzy membership functions). Each component of the vector represents a specific type of similarity.

The alignment generator 220 outputs a set of fuzzy correspondences in the form of data sets including an identifier of an alignment, the characteristic portions of each data set, as well as the relation, relation score, and confidence score. Details regarding computation of alignments are discussed below in connection with the example embodiment of FIG. 3.

The query processing system 230 uses the generated alignments from the alignment generator 220 to allow for querying across disparate ontologies linked together. Specific mechanisms for query processing performed by the query processing system 230 are discussed below in connection with the example embodiments of FIGS. 8-10.

Figure 3:
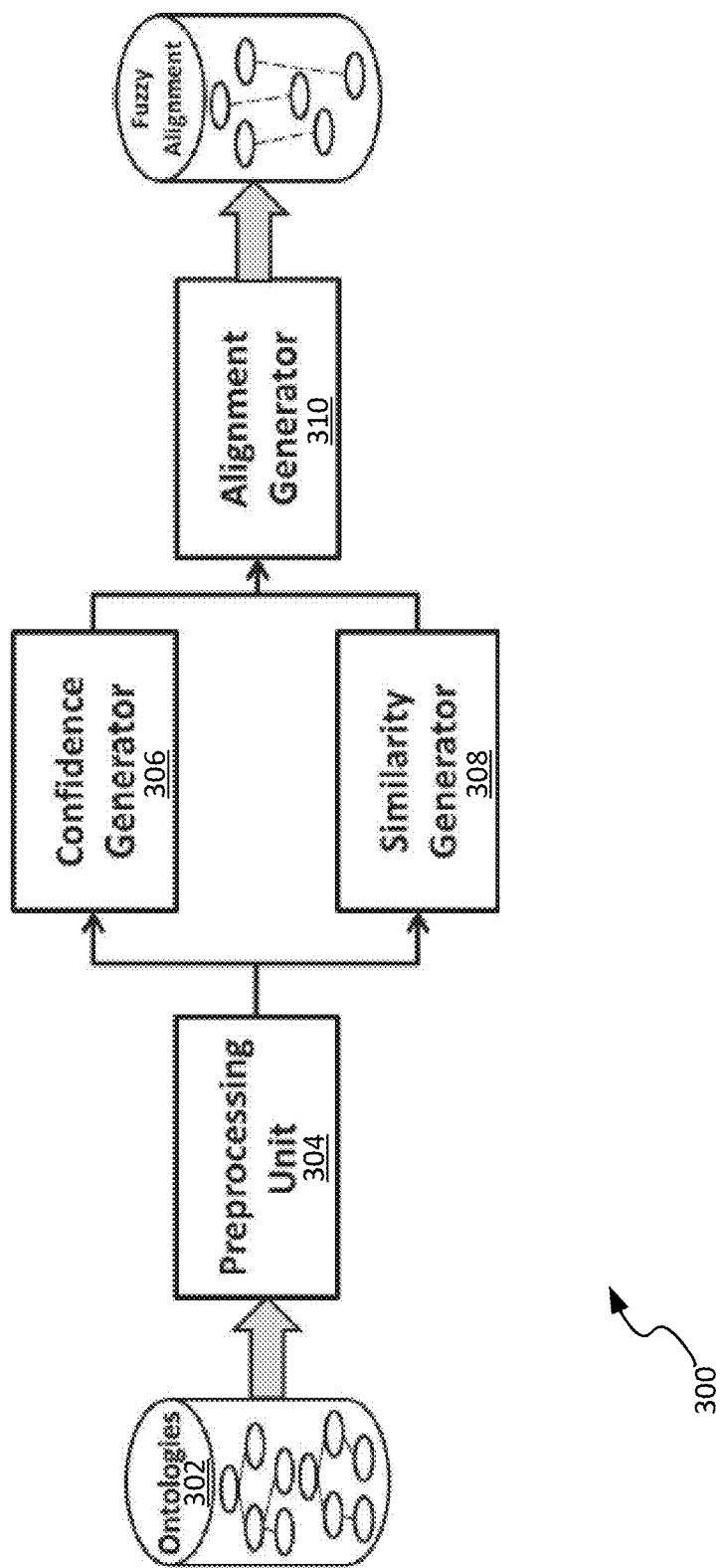
FIG. 3 illustrates a system for semantically linking large ontologies, according to an example embodiment.

Referring now to FIG. 3, a system 300 for semantically linking large ontologies is shown, according to an example embodiment. The system 300 can be implemented using, for example, the computing system 200 of FIG. 2.

In the embodiment shown, a collection of ontologies 302 is provided to the system, for example by being stored in one or more databases accessible to an ontology matching and querying application 212, or otherwise being provided as semantic web formatted data.

Generally, the system 300 is configured to find an alignment A for a pair of ontologies $O_1$ and $O_2$. The ontology alignment is a set of correspondences between entities of matched ontologies; each correspondence represents a set of information that identifies the alignment, including an identifier (id), the entities of correspondence between the two ontologies ($E_1$, $E_2$), and a relation r between the two (e.g., equivalence, disjointedness, etc.). Because, in the present system, fuzzy correspondences between entities are determined, additional features can be tracked for a particular alignment, i.e., including a relation score (s) and a confidence score (c) that is computed when determining correspondences.

The ontologies 302 are provided to a preprocessing unit 304, which can be implemented using the preprocessing unit 214 of FIG. 2. The preprocessing unit 304 is a constraint-based classifier that classifies the entities based on their types. In example embodiments three subtypes of the DatatypeProperty are defined: String, Datetime, and Numerical. Specifically, an entity is classified as one of the following types: ObjectProperty, String DatatypeProperty, Datetime DatatypeProperty, and Numerical DatatypeProperty.

For DatatypeProperty, rdfs:range is used to decide which specific DatatypeProperty it belongs to. If the range is xsd:decimal, xsd:float, xsd:double or xsd:integer, it is a Numerical DatatypeProperty. If the range is xsd:dateTime, xsd:time or xsd:date, it is a Datetime DatatypeProperty. If the range is none of above, it is a String DatatypeProperty. Based on this entity classification, different matching algorithms will be applied during similarity generation.

Pre-processed data (or data in a semantic web format that does not require preprocessing) is provided to a confidence generator 306 and a similarity generator 308. The confidence generator 306 computes a confidence score for each correspondence which reflects the sufficiency of the underlying data resources used to generate this correspondence. For correspondence between properties, their instances are the main resources. Intuitively, the more instances that are used for computing similarity, the more confidence can be had in the matching process.

In order to quantify the sufficiency of the properties, two metrics are identified, volume and variety. The volume of resources related to property E of class T is defined as $$VO(E) = \frac{|\{t \in T \mid t.E \neq \emptyset\}|}{|\{t \in T\}|}$$

where $|\{t \in T\}|$ is the number of instances of class T and $|\{t \in T | t.E \neq \emptyset\}|$ is the number of instances of class T with a non-null value for property E.

The variety of resources related to properties $E_1$ and $E_2$, V $A(E_1, E_2)$ quantifies the variety of the property instances using entropy. Variety can be defined as:

$$VA(E_1, E_2) = \frac{H(E_1) + H(E_2)}{\log(|v(E_1)||v(E_2)|)}$$

where v(E) is the set of non-null values of the entity E and $H(E_i)$ is the entropy of the values of property $E_i$:

$$H(E_i) = -\sum_{x \in v(E_i)} p_i(x)\log(p_i(x))$$

In this equation, $p_i(x)$ is the probability of property value x appearing as $E_i$'s instance:

$$p_i(x) = \frac{|\{t \mid t.E_i = x\}|}{|\{t \mid t.E \neq \emptyset\}|}$$

Accordingly, if the properties $E_1$ and $E_2$ have a large number of unique values relative to the number of class instances having those properties, then a larger variety score would occur.

Based on the volume and variety of the two properties, a confidence score of a correspondence between those properties could then be calculated by the confidence generator 306, as follows:

$$c(E_1, E_2) = \frac{VO(E_1) + VO(E_2) + 2VA(E_1, E_2)}{4}.$$

The similarity generator 308 performs a plurality of similarity analyses on two entities of the respective ontologies. For example, the similarity generator 308 can perform name-based similarity, overlapping similarity, containment similarity, and structural similarity analyses. Details regarding these analyses are discussed in further detail below in connection with FIG. 5. However, generally, similarity generator 308 generates a vector of similarities between two entities. The similarities form the basis for computing different types of relation correspondences (using respective fuzzy membership functions).

The alignment generator 310 generates a set of fuzzy correspondences in the form of tuples, including the identifier id, as well as the properties $E_1$ and $E_2$, the relation r, the relation score s, and confidence score c. In order to calculate the relation score s, a set of membership functions are pre-defined in UFOM. Each membership function corresponds to one type of relation. For example, the membership function for equivalence can be defined as a linear combination of all similarity values:

$$\left(\mu_{equ}(\vec{s}) = \frac{1}{4}(s_{na} + s_{ov} + s_{co} + s_{st})\right)$$

Similarly, the membership function for relevance can be written as a non-linear s-Function:

$$(\mu_{rel}(\vec{s}) = S(s_{co}; 0.2, 0.5, 0.7))$$

The relation score s can be computed by a corresponding membership function.

Then, the relation score s is computed by the corresponding membership function. Once both s and c are derived, the alignment generator 310 prunes the correspondences with s and c less than pre-defined cutoff thresholds s and c. Different applications will have different thresholds. For example, a recommendation system may have relatively low thresholds since false positives are tolerated, while a scientific application may have high thresholds.

Figure 4:
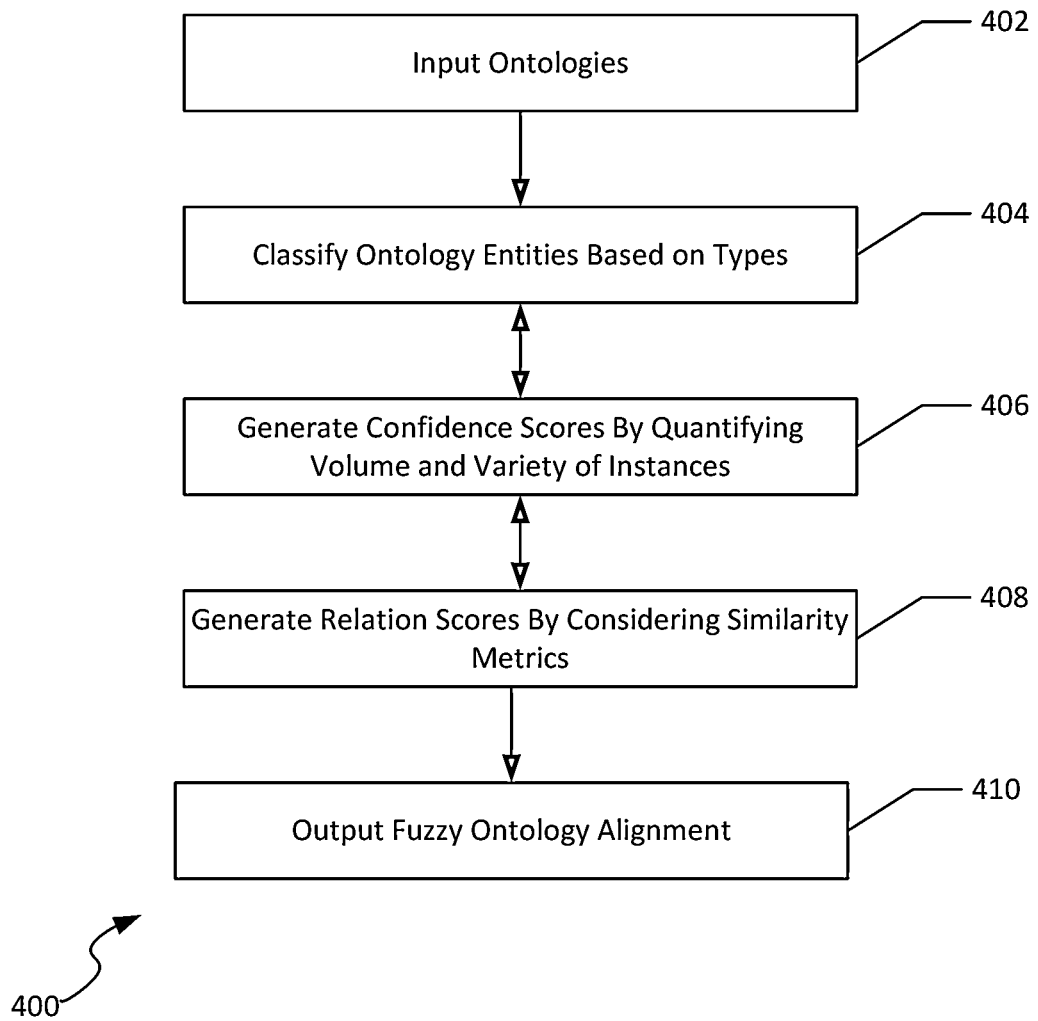
FIG. 4 illustrates a flowchart of a method for semantically linking large ontologies using the system of FIG. 3.

FIG. 4 illustrates a flowchart of a method 400 for semantically linking large ontologies using the system of FIG. 3. Generally, the method 400 begins with input of ontologies into a system, for example making those ontologies accessible to system 300, e.g., by making them accessible to computing system 200 of FIG. 2 (step 402). The ontologies are classified by type, and otherwise pre-processed via the preprocessing unit 304 (step 404).

Once preprocessed, the ontologies are analyzed to generate confidence scores (step 406) and relation scores (step 408). The generation of confidence scores and relation scores can be performed serially in either order, or in parallel. Generation of confidence scores can occur based on operation of the confidence generator 306 as explained above, while generation of similarities can be performed using a similarity generator 308 as in FIG. 3, the details of which are (as noted above) discussed below in connection with FIG. 5.

Figure 5:
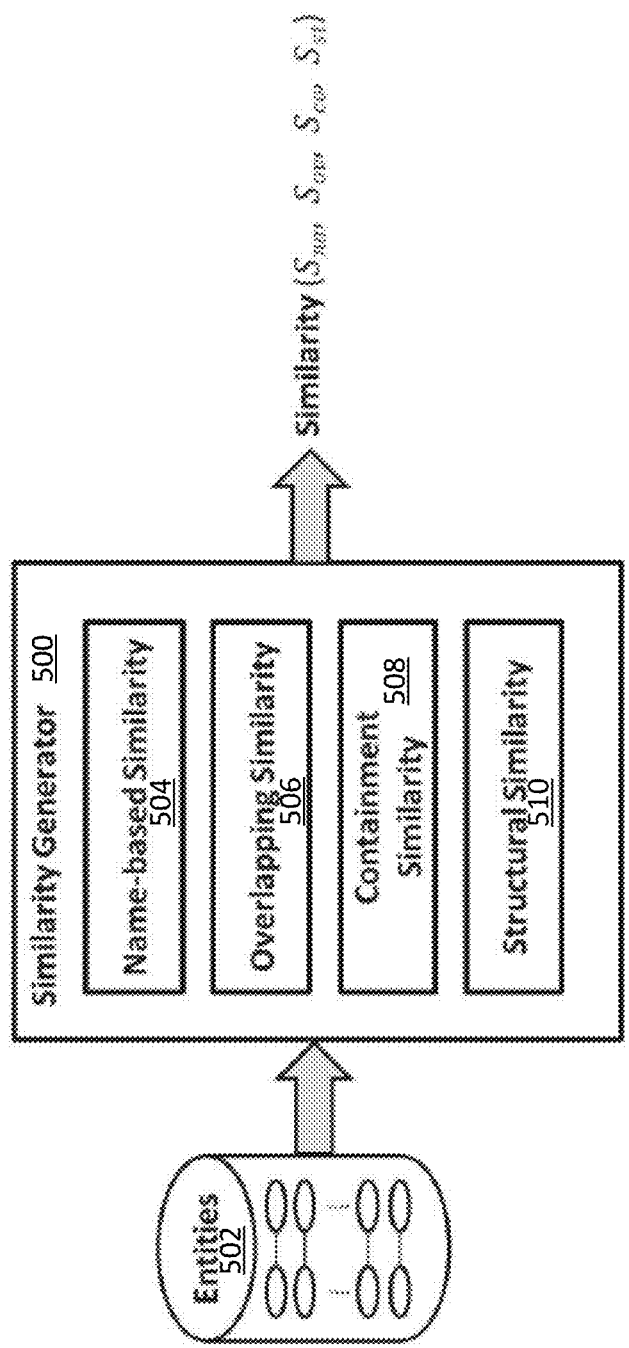
FIG. 5 illustrates a system for determining a relation score useable in the system of FIG. 3, according to an example embodiment.

FIG. 5 illustrates a system 500 for determining a relation score useable in the system of FIG. 3, according to an example embodiment. The system 500 can implement, in some embodiments, the similarity generator 308 of FIG. 3, e.g., as an implementation of similarity generator 218 on computing system 200 of FIG. 2.

In the embodiment shown, formatted ontology data 502 is provided to the similarity generator 500, which includes a plurality of similarity computation modules. The similarity computation modules include a name-based similarity module 504, an overlapping similarity module 506, a containment similarity module 508, and a structural similarity module 510.

The name-based similarity module 504 calculates a name-based similarity based on the names of the two properties. For example, semantic similarity $s_{se}$ and syntactic $s_{sy}$ similarity of their names. For semantic similarity, the following steps are used to generate $s_{se}$:

First, the names of both properties are tokenized, denoting by $E_i.TOK_j$ as the j-th token in the name of property $E_i$.

Next, the synset of each token is retrieved using Open Linked Data (WordNet), where syn(w) denotes the WordNet synset of a word w.

Further, the Jaccard similarity of the synsets is calculated on each pair of tokens.

Next, the average-max Jaccard similarity is returned as the semantic similarity, based on the equation:

$$s_{se}(E_1, E_2) = \frac{1}{n} \times \sum_i \max_j Jac(syn(E_1.TOK_i), syn(E_2.TOK_j)).$$

In the above, Jac( ) represents the Jaccard similarity, and n is the number of tokens in $E_1$'s name.

In an example application of operation of the semantic similarity module, consider two properties named complete_date and EndDate, as in ontologies 102a-b. In the first step, the two names are tokenized into two sets {"complete", "date"} and {"End", "Date"}. In the second step, the synsets of "complete", "date" and "end" are retrieved from WordNet. In the third step, we calculate the Jaccard similarity for each pair of tokens ("complete"-"end", "complete"-"date", "date"-"end" and "date"-"date"). Finally, we find the maximum Jaccard similarity for each token in the first property name and average the similarity over all tokens in the first property name. In this example, $s_{se}=\frac{1}{2}\times(Jac(syn(\text{"complete"}), syn(\text{"end"}))+Jac(syn(\text{"date"}); syn(\text{"date"})))$.

For syntactic similarity, a Levenshtein distance is adopted as the distance metric between the names of the two properties. Formally, the syntactic similarity, $s_{sy}(E_1;E_2)$ between two properties $E_1$ and $E_2$ is:

$$s_{sy}(E_1, E_2) = 1 - \frac{Lev(E_1 \cdot Name, E_2 \cdot Name)}{\max(|E_1 \cdot Name|, |E_2 \cdot Name|)}$$

where $E_i$:Name denotes the name of property $E_i$, |$E_i$:Name| is the length of the name string, and Lev($w_1;w_2$) is the Levenshtein distance between two words $w_1$ and $w_2$. In the above example, the syntactic similarity between complete_date and EndDate is $1-8/13=0.3846$.

In an example application of semantic and syntactic similarity, and in particular in an oil well application, consider two ontologies. Ontology 1 contains one property E1 with name "well_name" and four instances:

| Well_Name |
| --- |
| well a |
| WELL2B |
| WELC 8 |
| WEL123D |

Ontology 2 contains two properties, E2 and E3, with names "event" and "acl_name" respectively, each containing 6 instances "well_name" and four instances"

| Event | acl_name |
| --- | --- |
| WEL1A needs cellar guzzled out | well a |
| WellA s/d- Repack stuffing box | well a |
| RIG SUPPORT WELL2B | WELL2B |
| WELC - Destroke unit to #3 hole (107) DONE | |
| WelC - Install pumping unit after workover | |
| P AB1234--><IDLE> | WEL123D |

Considering these ontologies, two example properties well_name and acl_name are determined. In such a case, synsets are calculated for each token: "well", "name", "acl" and "name". E.g.:

syn(well)={excavation, artesian well, driven well, tube well, gas well, oil well, oiler, sump, inkwell, inkstand, vessel, fountainhead, wellspring, source, stairwell, shaft, bilge well, pump well, compartment . . . } syn(name)={agnomen, assumed name, fictitious name, Doing Business As, DBA, eponym, patronymic, patronym . . . } syn(acl)={ }

Because syn(acl) and syn(name) have no overlap with syn(name), Jac(syn(well),syn(acl))=Jac(syn(well),syn(name))=0. However, for the second token "name" of the first property name. Jac(syn(name), syn(name))=1.

So based on the equation in step 4), $s_{se}(E_1,E_3)=\frac{1}{2}*(0+1)=0.5$

For syntactic similarity, $s_{sy}(E_1, E_3)=1-3/9=0.67$ where 3 is the Levenshtein distance between $E_1$ and $E_3$ and 9 is the length of "well_name".

The name-based similarity is a weighted sum of the above two similarities:

$$s_{na}(E_1,E_2)=w_{se}s_{se}(E_1,E_2)+w_{sy}s_{sy}(E_1,E_2)$$

Accordingly, continuing the above calculation, name-based similarity can be calculated as: 0.5*(0+1)/2+ 0.5*0.67=0.59. Similarly, we get the name-based similarity between E1 and E2 $s_{na}(E_1,E_2)$=0.5*0+0.5*0.22=0.11.

In some embodiments, the weights are pre-defined as system parameters. In still further embodiments, machine learning techniques can be used to learn the weights from labeled datasets.

The overlapping similarity module 506 models the likelihood that the same word appears in instances of both properties. In particular, this is approximated by assuming that instances of each property are drawn independently. For example, the overlapping similarity, $s_{ov}(E_1;E_2)$ between two properties $E_1$ and $E_2$ is defined as:

$$s_{ov}(E_1, E_2) = \sum_{e_1 \in E_1} p(e_1 \subset W_2) = \sum_{e_1 \in E_1} \prod_{w \in e_1} \frac{n(w, E_2)}{|W_2|}$$

Here, w∈$e_1$ denotes the words comprising the instance $e_1$. $n(w,E_2)$ is the number of appearances of w in the instances of $E_2$, and $|W_2|$ is the total number of words in the instances of E2.

In an example data set with 25 words in its instances ($|W_2|$=25) and E3 has 4 words in its instances ($|W_3|$=4). A first word in $E_1$, e.g., "wel1a" appears twice in $E_3$'s words. Similarly for E1's other words, e.g., "WELL2B" and "WEL123D" appear once and has no appearances in E3's words. So using the above equations, $s_{ov}(E_1,E_3)$=(2+1+0+1)/4=1 where 4 is the number of words in $E_3$'s instances Similarly, $s_{ov}(E_1,E_2)$=(2+1+2+0)/25=0.24.

The containment similarity module 508 models the average similarity between an instance of property $E_1$ and the most similar instance in property $E_2$. Specifically, it is calculated as $$s_{co}(E_1, E_2) = \frac{1}{|v(E_1)|} \sum_{e_1 \in E_1} \max_{e_2 \in E_2} SWS(e_1, e_2)$$

$SWS(e_1,e_2)$ calculates the Smith-Waterman Similarity between two instances $e_1$ and $e_2$ treated as a sequence of characters. The Smith-Waterman Similarity identifies local sequence alignment and finds the most similar instances of $E_2$ given an instance of $E_1$. For example, if $e_1$ is "Stephen W. Hawking" and $e_2$ is "A Brief History of Time by Stephen Hawking", then, $SWS(e_1,e_2)$=15/18=0.8333.

Note that containment similarity is asymmetric. Intuitively, the greater the number of instances in $E_2$ compared to the number of instances in $E_1$, the more likely that $E_1$ is contained within $E_2$.

Continuing the example above of Ontologies 1 and 2, calculating the Smith-Waterman Similarity $SWS(e_1,e_2)$ between two entries. Smith-Waterman Similarity can best capture the sub-alignment between two strings. For example, SWS("wel1a", "WEL1A needs cellar guzzled out")=1 and SWS("WELC 8", "WELC—Destroke unit to #3 hole (107) DONE")=4/6=0.67, as a result using the above equation: $s_{co}(E_1,E_2)$=(1+1+0.67+0)/4=0.6675 where 4 is the number of entries of $E_1$. Similarly, we get the containment similarity between $E_1$ and $E_3$, $s_{co}(E_1,E_3)$=(1+1+0+1)/4=0.75.

The structural similarity module 510 captures the structural similarity between two properties. Because the ontologies are represented as a graph with properties as edges and classes as nodes, if two properties have similar domains and ranges (classes), then they are assigned high similarity. In turn, two classes that have similar properties should have higher similarity.

The following iterative equations are used to refine the edge (property) similarity. At every iteration t, the node similarity is updated based on the edge similarity of iteration t:

$$s_N^t(n_i, n_j) = \frac{1}{2N} \sum_{s(k)=i,s(l)=j} s_E^t(e_k, e_l) + \frac{1}{2M} \sum_{t(k)=i,t(l)=j} s_E^t(e_k, e_l)$$

Then, the edge similarity of the next iteration is calculated from the node similarity of iteration:

$$s_E^{t+1}(e_i, e_j) = \frac{1}{2}(s^t(n_{s(i)}, n_{s(j)}) + s^t(n_{t(i)}, n_{t(j)}))$$

In these equations, s(k)=i and t(k)=j denotes that edge $e_k$ is directed from node $n_i$ to $n_j$, i.e., property $E_k$ has domain class $T_i$ and range class $T_j$. N is the number of properties which have its domain as $T_i$ multiplied by the number of properties which have its domain as $T_j$. Similarly, M is the number of properties which have its range as $T_i$ multiplied by the number of properties which have its range as $T_j$.

The initial edge similarities are set from the weighted sum of the previously defined three similarities.

$$s_E^0(e_i, e_j) = \omega_{na}\delta(s_{na}(E_i, E_j)) + \omega_{ov}\delta(s_{ov}(E_i, E_j)) + \omega_{co}\delta(s_{co}(E_i, E_j))$$

$$\delta(x) = \frac{1}{1 + e^{-k(x-a)}}$$

In some embodiments, a non-linear addition (function) is used to better distinguish between similarity values that are close to the median than a linear weighted sum. In some cases, k=5. As in the case of name-based similarity, we will consider using machine learning techniques to learn these weights automatically from labeled ontology matching data.

The algorithm halts when $|s_E^{t+1}(e_i,e_j) - s_E^t(e_i,e_j)| < \epsilon$. The structural similarity is then set as:

$$s_{st}(E_i, E_j) = s_E^{t+1}(e_i, e_j)$$

Continuing the example of Ontologies 1 and 2 above, The calculation of structural similarity is an iterative process. The initial values are set based on the equation above. For example, the initial values for the edge similarity between $E_1$ and $E_2$ (all weights are ⅓) is $sE(E_1,E_2)$=(0.11+0.24+0.6675)/3 and between $E_1$ and $E_3$ is $SE(E_1,E_3)$=(0.59+1+0.75)/3.

Besides entities $E_1$, $E_2$ and $E_3$, the ontology also has other entities (classes or properties). For example, "well_name" is a property of class $C_1$ and "acl_name" is a property of class $C_2$. $C_1$ and $C_2$ may have properties with high similarity like "area", "oil_field" etc. This information will help to increase the structural similarity between "well_name" and "acl_name" in the iterative algorithm. The process halts when the similarities $sE(E_1,E_2)$ in two iterations do not differ a lot, say the difference is less than a threshold epsilon.

Finally, the similarity generator outputs a vector of similarities for each pair of properties. The vector for property pair ($E_i$, $E_j$) is represented as $$(s_{na}(E_i,E_j), s_{ov}(E_i,E_j), s_{co}(E_i,E_j), s_{st}(E_i,E_j)).$$

The similarity generator 500 outputs a similarity vector, which is provided to alignment generator 310, which receives the similarity vector and outputs for each of a plurality of possible alignment vectors, prunes those below a particular threshold level, as noted above.

Continuing the example of Ontologies 1 and 2 above, Once both confidence score and similarity vector are derived, fuzzy correspondences can be determined. The relation scores between E1 and E2, E1 and E3 are calculated using the membership functions:

$$sequ(E1,E2) = \tfrac{1}{4}(0.11 + 2*0.24 + 0.6675) = 0.31$$

$$sequ(E1,E3) = \tfrac{1}{4}(0.59 + 2*1 + 0.75) = 0.84$$

$$srel(E1,E2) = \tfrac{1}{4}*0.11 + \tfrac{3}{4}*0.6675 = 0.53$$

$$srel(E1,E3) = \tfrac{1}{4}*0.59 + \tfrac{3}{4}*0.75 = 0.71$$

Outputs are therefore:
<1, E1, E2, equivalence, 0.31, 1>
<2, E1, E3, equivalence, 0.84, 0.855>
<3, E1, E2, relevance, 0.53, 1>
<4, E1, E3, relevance, 0.71, 0.855>

Figure 6:
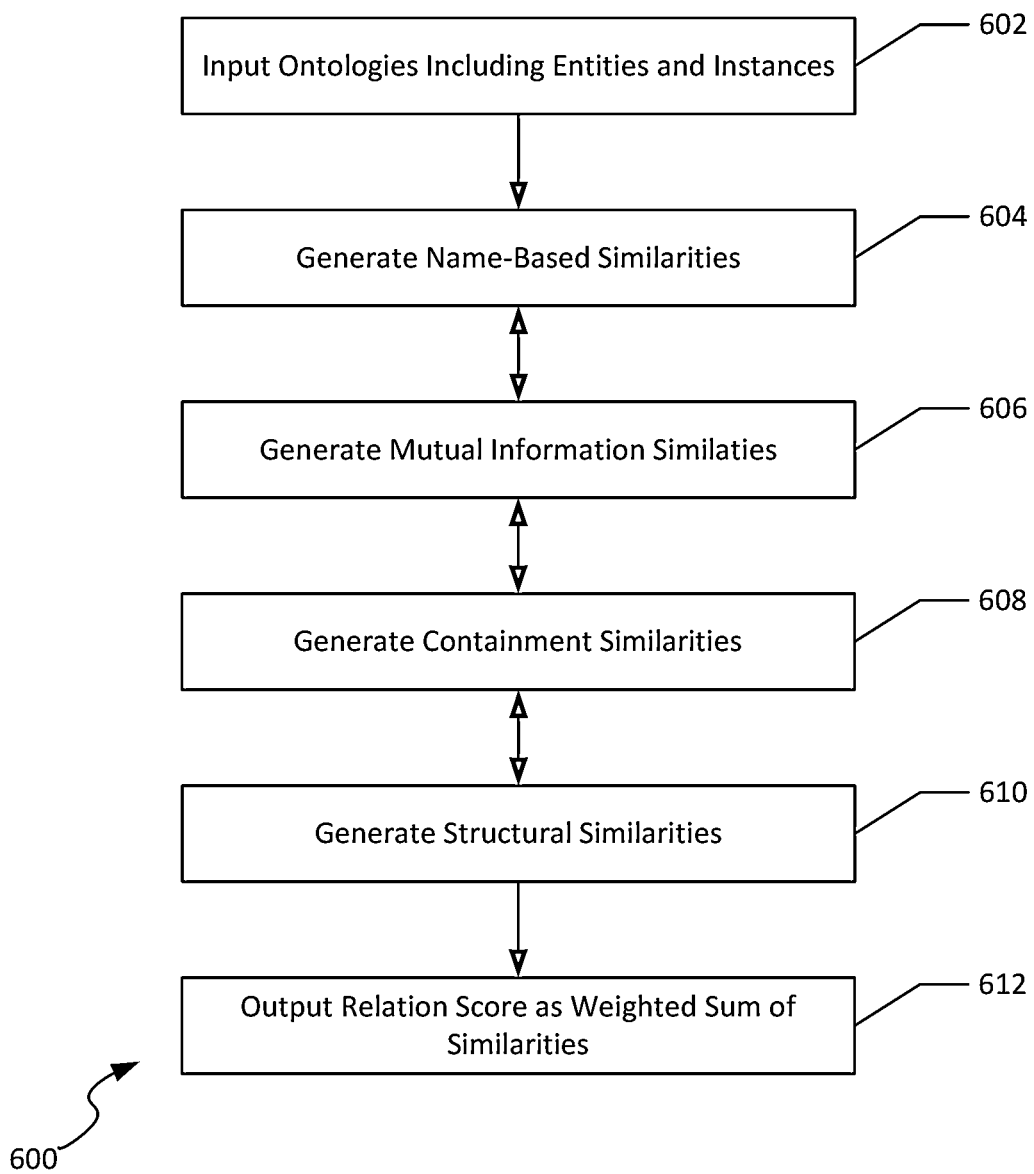
FIG. 6 illustrates a flowchart of a method for determining a relation score using the system of FIG. 5.

FIG. 6 illustrates a flowchart of a method 600 for determining a relation score using the system of FIG. 5. The method 600 can be performed, for example, by the similarity generator 218 of computing system 200 of FIG. 2.

In the embodiment shown, the method 600 includes inputting ontologies including entities and instances into the system (step 602). The method further includes, either in series or parallel: (1) generating name-based similarities (step 604), for example using the name-based similarity module 504 of FIG. 5; (2) generating mutual information similarities (step 606), for example using the overlapping similarity module 506 of FIG. 5; (3) generating containment similarities (step 608), for example using the containment similarity module 508 of FIG. 5; and (4) generating structural similarities (step 610), for example using the structural similarity module 510 of FIG. 5. Once all of the similarities are generated, an output relation score can be generated as a weighted sum of each of the calculated similarities (step 612). For example, such a weighted sum could be calculated based on:

$$\left(\mu_{equ}(\vec{s}) = \frac{1}{4}(s_{na} + s_{ov} + s_{co} + s_{st})\right)$$

Then, the relation score s is computed by the corresponding membership function, and correspondences having a relation score s or confidence score c below a threshold are cut off (as by alignment generator of FIG. 3).

Figure 7:
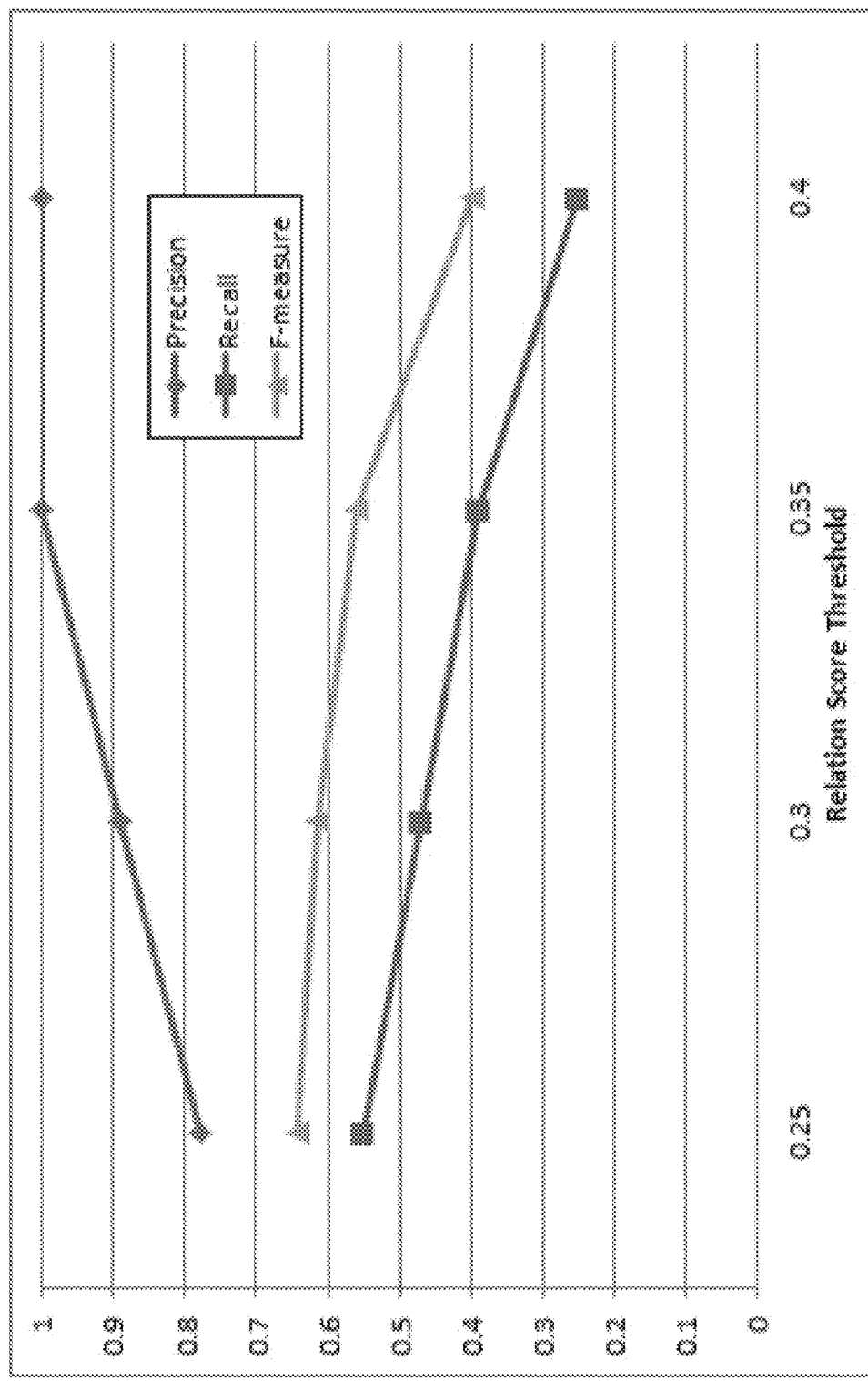
FIG. 7 illustrates a chart representing an evaluation of the ontology matching systems and methods described herein.

FIG. 7 illustrates a chart 700 representing an evaluation of the ontology matching systems and methods described herein. As illustrated in the chart 700, a set of experiments using two sets of ontologies provided by Ontology Alignment Evaluation Initiative (OAEI) 2013 Campaign. The first dataset is Conference Ontology3 which contains 16 ontologies. In the experiment represented in chart 700, the alignment is sought between two specific ontologies Cmt and ConfTool. In total, Cmt has 59 properties and ConfTool has 36 properties. The second set is Instance Matching (IM) Ontology. It has 5 ontologies and 1744 instances.

In the chart 700 as represented herein, the weights for the name-based similarity and the structural similarity are set as ½ and ⅓. The membership function is constructed as $$\mu_{equ}(\vec{s}) = \frac{s_{na} + s_{ov} + s_{co} + s_{st}}{4}$$

For Conference Ontology, the relation score threshold is set as 0.25, 0.3, 0.35, and 0.4 (the upper bound of the score is 0.5 since soy=sco=0). Precision, recall, and F-measure are calculated to evaluate the performance of the system.

As illustrated in chart 700, as the relation score threshold increases, precision increases while recall and F-measure decrease. Compared with the baseline matcher in OAEI 2013, when recall is the same (0.39), precision for the system described herein is 1.0 while for the baseline is 0.76. Accordingly, the present ontology matching operations provide for improved ontology matching as compared to existing systems.

In some embodiments, from the above, a relevance can be calculated for the links between ontologies. For the evaluation of computing relevance alignment, ontologies $O_1$ and $O_2$ were calculated from an enterprise-scale information repository. Each ontology focuses on a different application area within the enterprise, but they are related in terms of the entities that they reference. Example ontology $O_1$ has 125865 triples. Example ontology $O_2$ has 651860 triples. The task is to find all relevant properties in $O_2$ given a property E in $O_1$. The weights for the name-based similarity and the structural similarity are set as ½ and ⅓. The relevance membership function is constructed as $$\mu_{rel}(\vec{s}) = \frac{1}{4}s_{na} + \frac{1}{2}s_{co} + \frac{1}{4}s_{st}$$

Relevances are qualitatively labeled on the example data set, as illustrated in Table 2, below.

TABLE 2

Results for Relevance Relation

| $O_2$ Property | Relevance | Confidence | Domain Expert |
|---|---|---|---|
| $E_1$ | 73.93% | 92.85% | Highly Relevant |
| $E_2$ | 38.94% | 87.73% | Relevant |
| $E_3$ | 38.89% | 93.21% | Relevant |
| $E_4$ | 30.89% | 87.73% | Relevant |
| $E_5$ | 23.95% | 97.98% | Relevant |
| $E_6$ | 0.67% | 77.31% | Irrelevant |
| $E_7$ | 0.67% | 76.26% | Irrelevant |
| $E_8$ | 0.67% | 72.98% | Irrelevant |

Figure 8:
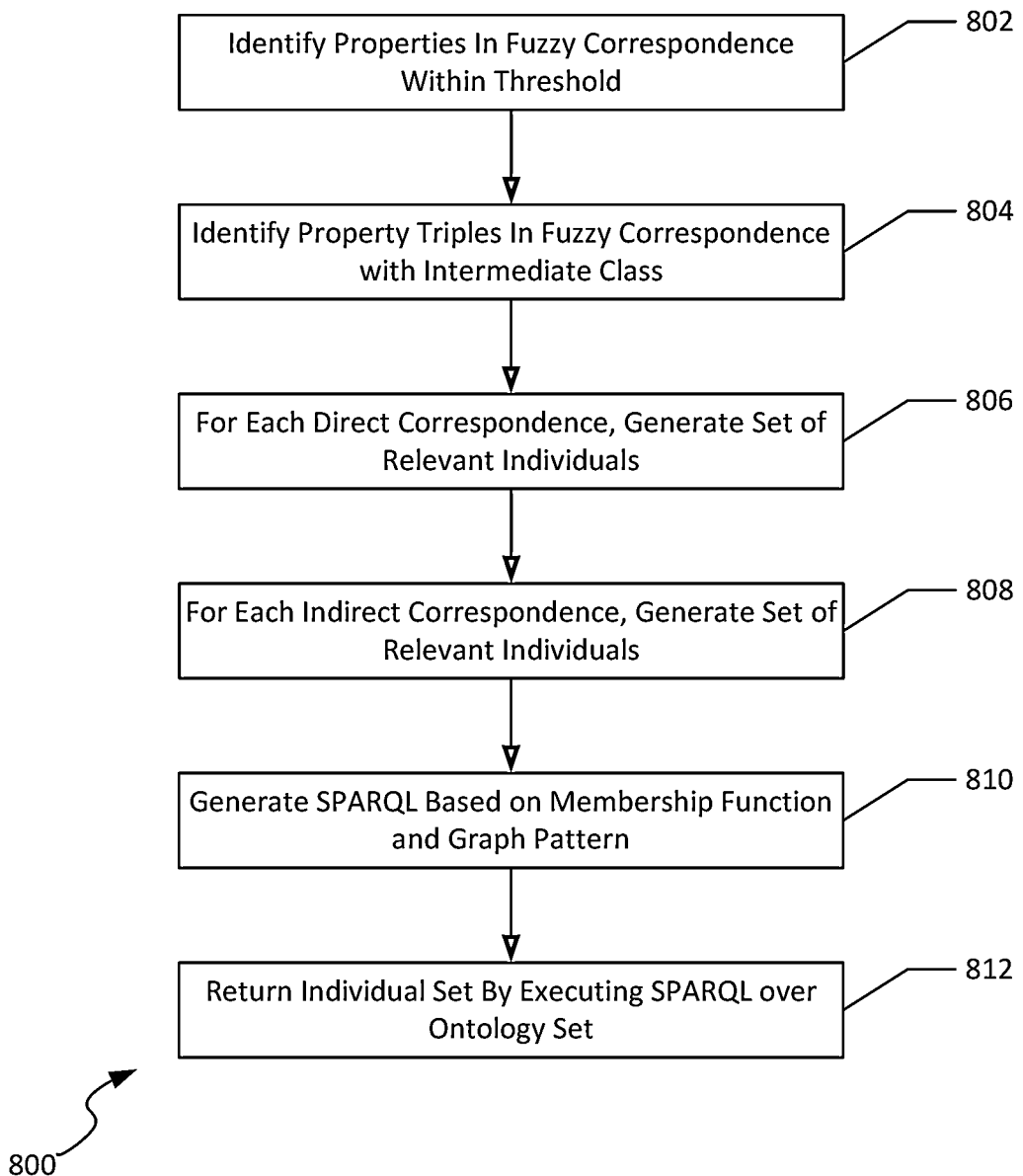
FIG. 8 illustrates a flowchart for performing a search across semantically linked ontologies, according to an example embodiment of the present disclosure.
Figure 9:
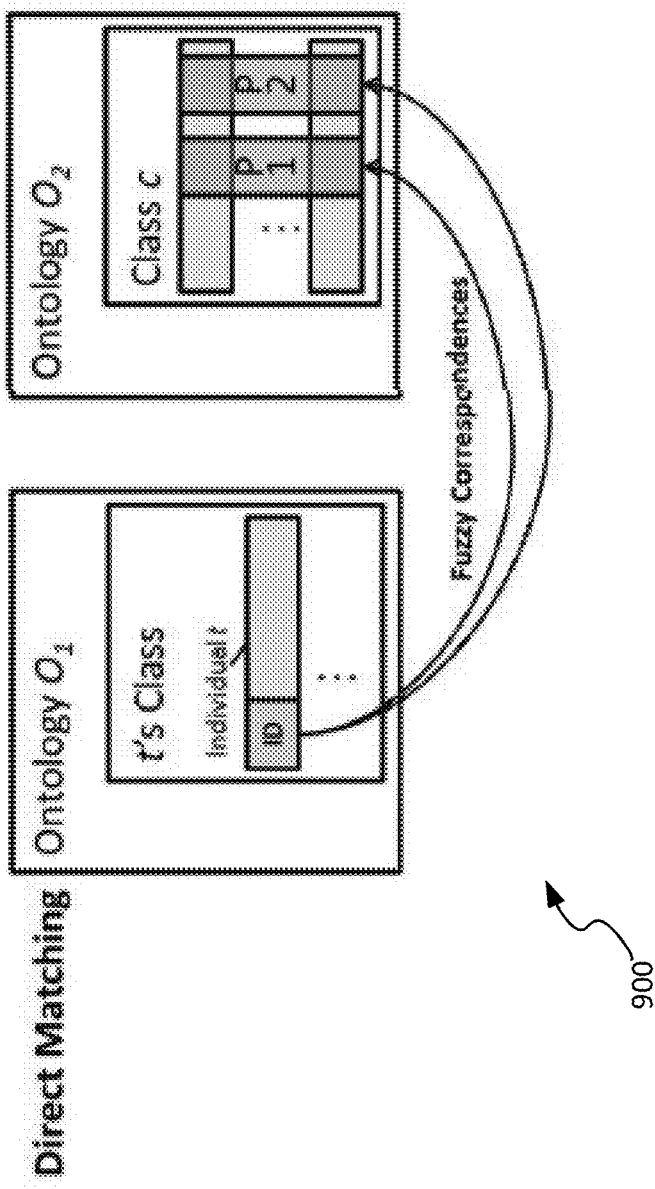
FIG. 9 illustrates an example of first and second directly linked ontologies across which a query can be executed, according to an example embodiment.
Figure 10:
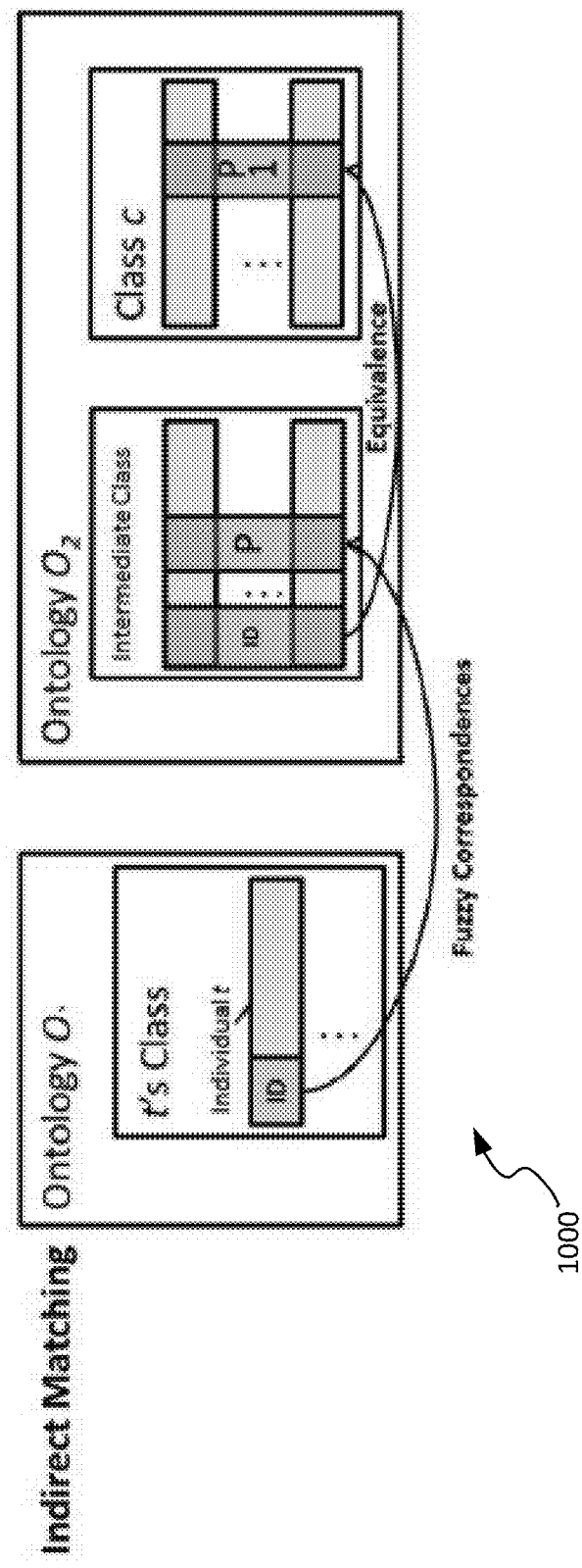
FIG. 10 illustrates an example of first and second indirectly linked ontologies across which a query can be executed, according to an example embodiment.

Referring now to FIGS. 8-10 details are discussed regarding performing a search across semantically-linked ontologies, according to an example embodiment. Such a search can be across either directly or indirectly linked ontologies, as discussed below.

FIG. 8 illustrates a flowchart of a method 800 for performing a search across semantically linked ontologies, according to an example embodiment of the present disclosure. The method 800 can be performed, for example, by the query processing system 230 of the computing system 200 of FIG. 2.

In the embodiment shown, method 800 includes identifying properties in direct fuzzy correspondence within a threshold level (step 802). In particular a set of properties $E_{direct}=\{e_1, e_2, \ldots, e_m\}$ in $O_2$ where $e_j$ is in a fuzzy correspondence <id, $e^t$, $e_j$, r, s, c> (e.g., as illustrated in FIG. 9). In such an arrangement s and c are greater than user-defined thresholds, meaning the link between ontologies is greater than a predetermined strength for that particular direct correspondence.

The method 800 further includes identifying property triples in fuzzy correspondence with an intermediate class (step 804). In this case, the indirect property $E_{direct}=\{\{e_1^1, e_1^2, e_1^3\}, \ldots \{e_1^1, e_n^2, e_n^3\}\}$ in O2 and properties are common with an intermediate class (e.g., as illustrated in FIG. 10).

The method 800 includes, for each direct correspondence, generating a set of relevant individuals (step 806). This includes generating a fuzzy SPARQL ("SPARQL Protocol and RDF Query Language") using a direct matching generation rule, and calculating a seed vector $\vec{s}=\{s_{syn}, s_{sem}, s_{con}\}$ for each pair (t, $v_x$) where t is a given individual and $v_x$ is a value in $e^j$. It further includes generating individuals with grades calculated by a relevance function of the seed vector in the instance ontology.

The method also includes, for each indirect correspondence, generating a set of relevant individuals (step 808). As above, this includes generating a fuzzy SPARQL ("SPARQL Protocol and RDF Query Language") using a direct matching generation rule, and calculating a seed vector $\vec{s}=\{s_{syn}, s_{sem}, s_{con}\}$ for each pair (t, $v_x$) where t is a given individual and $v_x$ is a value in $e_2^1$. It further includes generating individuals with grades calculated by a relevance function of the seed vector in the instance ontology.

The method also includes generating a SPARQL based on a membership function and a graph pattern (step 810). In example embodiments, the graph pattern correspond to a value in the direct or indirect property, $E_{direct}$ or $E_{indirect}$.

The method further includes returning an individual set by executing the SPARQL over an entire linked ontology set (step 812), for example by executing the SPARQL generated in step 810.

As seen in FIG. 9, an example illustration 900 of first and second directly linked ontologies across which a query can be executed, according to an example embodiment. In this example, properties having a direct relationship have a fuzzy correspondence, and can be linked for purposes of the SPARQL, e.g., using steps 802 and 806.

For direct matching, properties in $O_2$ are retrieved which have fuzzy relations equivalence and relevance) with t's identifier property (e.g., ID) using the fuzzy alignment derived as noted above. For example, the following SPARQL code retrieves only the relevant properties of id based on direct matching. Thresholds for relation score and confidence score (e.g., 0.5 and 0.7) are also specified in the query.

```
SELECT ?prop WHERE {
?prop ufom:type "onto2 prop".
?corr ufom:hasProp1 onto1:id.
?corr ufom:hasProp2 ?prop.
?corr ufom:relation "Relevance".
?corr ufom:score ?s.
FILTER (?s > 0.5).
?corr ufom:conf ?c.
FILTER (?c > 0.7).
}
```

FIG. 10 illustrates an example illustration 1000 of first and second indirectly linked ontologies across which a query can be executed, according to an example embodiment. In this example, properties having an indirect relationship have a fuzzy correspondence, and can be linked for purposes of the SPARQL, e.g., using steps 804 and 808.

Indirect matching is used to identify entities that do not share a single correspondence with t but are related via intermediate properties, i.e., more than one correspondence. We first identify all intermediate classes in O2. The properties of such classes have a fuzzy relation with t's identifier property (e.g., id). From these intermediate classes, we discover the properties which are equivalent to the identifier of the intermediate class. This equivalence relation is found by checking Object Properties in O2. In contrast to direct matching which outputs a set of properties, indirect matching produces a collection of triples. Example SPARQL code retrieves relevant properties of id based on indirect matching.

```
SELECT ?prop1 ?prop2 ?prop3 WHERE {
?prop1 ufom:type "onto2 prop".
?prop1 rdfs:domain ?class.
?prop2 ufom:idof ?class.
?prop3 ufom:type "onto2 prop".
?prop3 rdfs:range ?class.
?corr ufom:hasProp1 onto1:id.
?corr ufom:hasProp2 ?prop1.
?corr ufom:relation "Relevance".
?corr ufom:score ?s.
FILTER (?s > 0.5).
?corr ufom:conf ?c.
FILTER (?c > 0.7).
}
```

Referring back to FIG. 8, and in particular steps 812-814, since, eventually the fuzzy queries will have to be converted to crisp ones, a seed vector is calculated for each value pair. The results are used to calculate the relevance scores which are stored as individuals in the instance ontology. The a-cut of the fuzzy terms based on the membership function is then computed in order to convert to a crisp query. The resulting crisp SPARQL consists of multiple graph patterns and each of these corresponds to a matched property. The individual set I is derived by executing this crisp SPARQL query. An example of such a crisp SPARQL query returning individuals ranked based on their membership grades is shown below.

```
SELECT ?d WHERE {
?x onto2:id ?d.
?x onto2:prop ?p.
?ins onto ins:value1 ?p.
?ins onto ins:value2 t.
?ins onto ins:type "relevance".
?ins onto ins:grade ?g.
FILTER (?g > 0.75).
}
ORDER BY DESC(?g)
```

Figure 11:
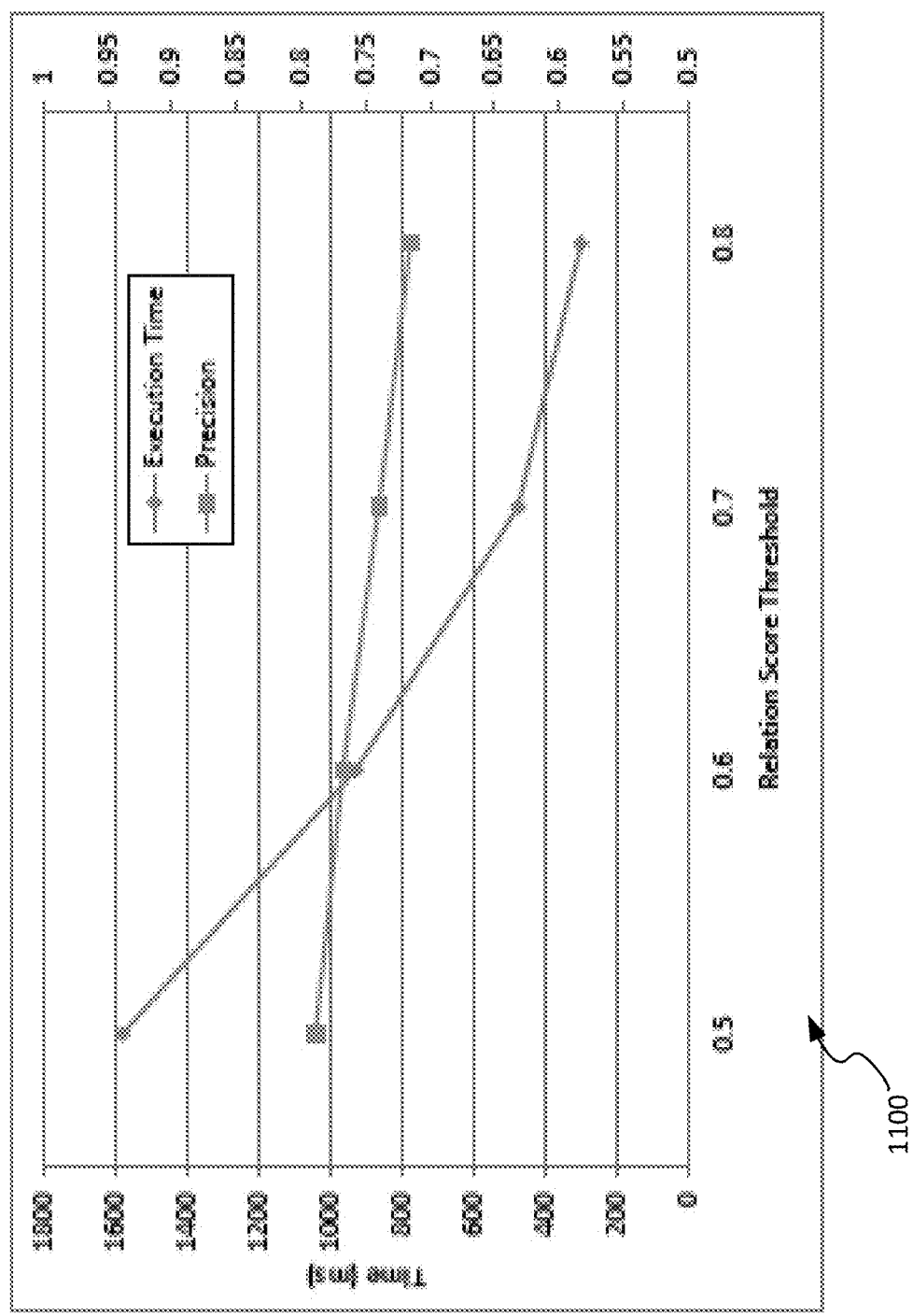
FIG. 11 illustrates a chart representing an evaluation of the querying across linked ontologies using the systems and methods described herein.

Accordingly, and as seen in the experimental example chart 1100 of FIG. 11, the computation cost for retrieving relevant instances can be reduced, as well as the time complexity in which calculation occurs. In this example, a set of experiments to evaluate the query execution process are shown in which the dataset is the Instance Matching (IM) ontology3 from OAEI 2013. The dataset has 5 ontologies and 1744 instances. As the relation score threshold increases, both precision and running time for query execution decrease. This is because the number of correspondences decreases when we raise the relation score threshold. As a result, fewer correspondences exist to consider when we generate crisp queries and therefore the computational time is reduced. The reason precision also decreases is that some true correspondences are lost when the relation score threshold is increased. Furthermore, correspondences can help in finding more related individuals. However, as shown in FIG. 11, an increase in the threshold from 0.5 to 0.8 causes precision to decrease by only 9.3% while execution time is reduced by 81.1%. This indicates that the elimination of correspondences caused by increasing the threshold do not affect retrieving correct related individuals significantly. This is because the remaining correspondences are still sufficient to find connections between classes. Additional advantages are provided as well, in connection with the present disclosure.

Referring generally to the systems and methods of FIGS. 1-11, and referring to in particular computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 200, above. Computer storage media does not include a carrier wave or other propagated or modulated data signal. In some embodiments, the computer storage media includes at least some tangible features; in many embodiments, the computer storage media includes entirely non-transitory components.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A computer implemented method of matching ontologies, the method comprising:
for each pair of entities of a first ontology and a second ontology, wherein each pair of entities includes a first entity from a first plurality of entities of the first ontology and a second entity from a second plurality of entities of the second ontology, and wherein the first entity and the second entity of each pair of entities is of a same data type:
determining a vector of similarities for the pair of entities;
determining a confidence score for the vector of similarities;
determining a relation score for each relation type based on the vector of similarities to measure relatedness between the first entity of the pair of entities and the second entity of the pair of entities; and
generating a mapping ontology based on the relation type, the relation score, and the confidence score of each pair of entities,
wherein a relation type is a relevance relation type defined as:

$$\mu_{rel}(\tilde{s}) = \frac{1}{4}s_{na} + \frac{1}{2}s_{co} + \frac{1}{4}s_{st},$$

where $s_{na}$ is a name-based similarity, $s_{co}$ is a containment similarity, and $s_{st}$ is a structural similarity.

2. The method of claim 1, further comprising determining a data type for each of the entities of the first ontology and each of the entities of the second ontology.

3. The method of claim 1, wherein each of the entities of the first ontology and each of the entities of the second ontology is at least one of a property or a class.

4. The method of claim 1, wherein determining the vector of similarities includes at least one of determining name-based similarity, determining overlapping similarity, determining containment similarity, or determining structural similarity.

5. The method of claim 4, wherein determining the name-based similarity includes at least one of determining a semantic similarity or determining a syntactic similarity.

6. The method of claim 5, wherein determining the semantic similarity includes:
tokenizing a name of the first entity of the pair and a name of the second entity of the pair;
retrieving a synset for each token;
determining a Jaccard similarity for each of the synsets; and
determining an average-max Jaccard similarity from the Jaccard similarity determined for each of the synsets, wherein the average-max Jaccard similarity is the semantic similarity.

7. The method of claim 6, wherein determining the average-max Jaccard similarity includes utilizing an equation, wherein the equation is:

$$s_{sc}(E_1, E_2) = \frac{1}{n} \times \sum_i \max_j Jac(syn(E_1 \cdot TOK_i), syn(E_2 \cdot TOK_j)).$$

8. The method of claim 5, wherein determining the syntactic similarity includes determining Levenshtein distance between a name of the first entity of the pair of entities and a name of the second entity of the pair of entities.

9. The method of claim 8, wherein determining the Levenshtein distance includes utilizing an equation, wherein the equation is:

$$s_{sy}(E_1, E_2) = 1 - \frac{Lev(E_1 \cdot Name, E_2 \cdot Name)}{\max(|E_1 \cdot Name|, |E_2 \cdot Name|)}.$$

10. The method of claim 5, wherein the name-based similarity is a weighted sum of the semantic similarity and the syntactic similarity.

11. The method of claim 4, wherein determining the overlapping similarity includes utilizing an equation, wherein the equation is:

$$s_{ov}(E_1, E_2) = \sum_{e_1 \in E_1} p(e_1 \subset W_2) = \sum_{e_1 \in E_1} \prod_{w \in e_1} \frac{n(w, E_2)}{|W_2|}.$$

12. The method of claim 4, wherein determining the containment similarity includes utilizing an equation, wherein the equation is:

$$s_{co}(E_1, E_2) = \frac{1}{|v(E_1)|} \sum_{e_1 \in E_1} \max_{e_2 \in E_2} SWS(e_1, e_2).$$

13. The method of claim 4, wherein determining the structural similarity includes utilizing an equation, wherein the equation is:

$$s_{st}(E_i, E_j) = s_E^{i+1}(e_i, e_j).$$

14. The method of claim 1, wherein determining the confidence score includes utilizing an equation, wherein the equation is:

$$c(E_1, E_2) = \frac{VO(E_1) + VO(E_2) + 2VA(E_1, E_2)}{4}.$$

15. The method of claim 1, wherein generating the mapping ontology includes:
  determining which of the pairs of entities has the relation score above a respective threshold and the confidence score above a respective threshold; and
  adding those determined pairs of entities into the mapping ontology.

16. The method of claim 1, further comprising creating the first ontology from a first dataset and the second ontology from a second dataset.

17. The method of claim 16, wherein the first dataset includes EAM data and the second dataset includes LOWIS data.

18. The method of claim 1, wherein the first ontology includes at least one of a schema ontology or an instance ontology, and wherein the second ontology includes at least one of a schema ontology or an instance ontology.

19. The method of claim 1, further comprising querying the mapping ontology.

20. The method of claim 1, wherein determining the relation score includes at least one of utilizing a probability model or utilizing a fuzzy set model.

21. An apparatus comprising:
  at least one memory storing program code; and
  at least one processor configured to access the memory and execute the program code to, for each pair of entities of a first ontology and a second ontology, wherein each pair of entities includes a first entity from a first plurality of entities of the first ontology and a second entity from a second plurality of entities of the second ontology, and wherein the first entity and the second entity of each pair of entities is of a same data type:
    determine a vector of similarities for the pair of entities;
    determine a confidence score for the vector of similarities;
    determine a relation score for each relation type based on the vector of similarities to measure relatedness between the first entity of the pair of entities and the second entity of the pair of entities; and
    generate a mapping ontology based on the relation type, the relation score, and the confidence score of each pair of entities,
    wherein a relation type is a relevance relation type defined as:

$$\mu_{rel}(\vec{s}) = \frac{1}{4}s_{na} + \frac{1}{2}s_{co} + \frac{1}{4}s_{st}.$$

where $s_{na}$ is a name-based similarity, $s_{co}$ is a containment similarity, and $s_{st}$ is a structural similarity.

22. A computer program product stored on a non-transitory memory, the computer program product comprising:
  program code to:
    for each pair of entities of a first ontology and a second ontology, wherein each pair of entities includes a first entity from a first plurality of entities of the first ontology and a second entity from a second plurality of entities of the second ontology, and wherein the first entity and the second entity of each pair of entities is of a same data type:
    determine a vector of similarities for the pair of entities;
    determine a confidence score for the vector of similarities;
    determine a relation score for each relation type based on the vector of similarities to measure relatedness between the first entity of the pair of entities and the second entity of the pair of entities; and
    generate a mapping ontology based on the relation type, the relation score, and the confidence score of each pair of entities,
    wherein a relation type is a relevance relation type defined as:

$$\mu_{rel}(\vec{s}) = \frac{1}{4}s_{na} + \frac{1}{2}s_{co} + \frac{1}{4}s_{st},$$

where $s_{na}$ is a name-based similarity, $s_{co}$ is a containment similarity, and $s_{st}$ is a structural similarity; and
a computer readable storage medium storing the program code.

* * * * *